(12) United States Patent
Oh

(10) Patent No.: US 6,354,525 B1
(45) Date of Patent: Mar. 12, 2002

(54) SPINNING REEL WITH DRAG BRAKE MECHANISM AND CLUTCH

(75) Inventor: Chul Suk Oh, Seoul (KR)

(73) Assignee: Shin A Sports Co., Ltd., Incheon (KR)

( * ) Notice: Subject to any disclaimer, the term of this patent is extended or adjusted under 35 U.S.C. 154(b) by 0 days.

(21) Appl. No.: 09/640,239

(22) Filed: Aug. 16, 2000

(51) Int. Cl.$^7$ .............................................. A01K 89/02
(52) U.S. Cl. ..................................... 242/245; 192/48.5
(58) Field of Search ................................ 242/245, 257, 242/260, 261, 263; 188/72.9, 71.1; 192/48.5

(56) References Cited

U.S. PATENT DOCUMENTS

| | | | | |
|---|---|---|---|---|
| 4,746,077 A | * | 5/1988 | Toda ........................... | 242/245 |
| 4,779,171 A | * | 10/1988 | Milano, Jr. et al. .......... | 242/257 |
| 5,186,412 A | * | 2/1993 | Park ............................ | 242/245 |
| 5,195,698 A | * | 3/1993 | Kyoichi ...................... | 242/245 |
| 5,201,477 A | * | 4/1993 | Kawabe ....................... | 242/245 |
| 6,198,908 B1 | * | 8/2000 | Ng ............................... | 242/245 |

* cited by examiner

*Primary Examiner*—Emmanuel M. Marcelo
(74) *Attorney, Agent, or Firm*—Baker & McKenzie

(57) ABSTRACT

A spinning reel having a main reel body, a spool supported so as to be rotatable around a spool shaft and movable toward an axial direction, and a drag brake mechanism for applying a braking force against rotation of the spool shaft. The spinning reel includes a spool shaft mounted in the reel body of the reel to be rotatable and axially movable; a clutch sleeve including a tubular portion having a non-circular internal surface and a circular external surface and mounted on one end portion of the spool shaft to be relatively unrotatable and axially movable, a flange having an engaging groove formed on one end of the tubular portion, and a plurality of projections protruded axially from the flange; a retainer sleeve including a plurality of recesses formed complementary to the projections on a side surface of the retainer sleeve facing the projections, and a non-circular tubular portion having a flat surface for supporting a drag braking plate and a plurality of washers to be relatively unrotatable; a master gear including a first gear meshed with a pinion gear mounted on one end of the spool shaft, a second gear meshed with an auxiliary gear, and a hollow shaft connecting the first and second gears in a vertical direction; a hollow operating member including a latch one end of which is inserted into the groove of the clutch sleeve, and a boss formed on the other end thereof; a pushing member located on an upper surface of the first gear of the master gear within a range of rotation of an arm extended radially from a rotating plate rotating together with the first gear and constantly abutting with a bent portion of the operating member by means of a spring; and a clutch member pivotally movable by means of the clutch lever.

5 Claims, 5 Drawing Sheets

SPINNING REEL WITH DRAG BRAKE MECHANISM AND CLUTCH

BACKGROUND OF THE INVENTION

1. Field of the Invention

The present invention relates to a fishing reel, and more particularly to a spinning reel comprising a reel body, a spool rotatably and axially movably supported on a spool shaft, and a drag brake mechanism for applying a braking force against rotation of the spool shaft.

2. Description of the Prior Art

An example of a spinning reel of this type is disclosed in Japanese Unexamined Utility Model Publication No. Sho 61-197872. According to the disclosure, the spinning reel comprises a reel body having a spool shaft and housing a retainer sleeve for holding a drag brake mechanism in a rear side thereof. A clutch sleeve is relatively unrotatably supported on the spool shaft in front of the retainer sleeve. Either the retainer sleeve or the clutch sleeve is movable relative to the other. One movable sleeve is urged for engagement with the other sleeve by a spring, so that the drag brake mechanism applies a braking force to the spool shaft. The braking force of the drag brake mechanism is nullified by separating the movable sleeve from the other sleeve against the urging force of the spring, thereby placing the spool shaft in a freely rotatable state.

With the above spinning reel, particularly where the retainer sleeve is movable, a clutch lever for moving the retainer sleeve is very heavy to operate when the braking force is applied to the spool shaft by the drag brake mechanism. Where the clutch sleeve is movable, the following problem arises.

The clutch sleeve is relatively unrotatably mounted on the spool shaft. The spring for urging the clutch sleeve toward the retainer sleeve is provided between the clutch sleeve and the reel body. Consequently, when the clutch sleeve is moved out of engagement with the retainer sleeve to render the spool shaft freely rotatable, the spring constantly applies a resistance to the spool shaft through the clutch sleeve. This is obstructive to free rotation of the spool supported on the spool shaft.

To overcome this problem, U.S. Pat. No. 5,201,477 issued to Toda discloses a spinning reel which allows the clutch lever to be operable with light touch. According to the Toda patent, the drag brake mechanism comprises two sets, i.e., a plurality of fixed brake members and a plurality of rotatable brake members. Those sets of the drag brake mechanism are arranged in a front chamber and rear chamber, respectively. The respective sets of the drag brakes are separately adjustable through first and second adjusting members, which are meshed at the support sleeve to enable a fine adjustment of a braking force applied to the spool shaft.

In addition, the rear end of the reel body houses a retainer sleeve rotatable around the spool shaft but not axially movable, to retain the rear drag brake mechanism. A clutch sleeve is mounted on the spool shaft in a manner that it is unrotatable relative to the retainer sleeve and is movable forwardly relative to the spool shaft. The clutch sleeve comprises a flange formed integral therewith and extending radially outwardly. The reel body houses a control member including a plurality of contact portions opposed to front and rear surfaces of the flange, a mechanism for automatically returning the control member to its original position, and a clutch lever for rocking the control member to move the clutch sleeve into or out of engagement with the retainer sleeve.

Referring to FIG. 2 of the Toda patent, the retainer sleeve supported around the rear portion of the spool shaft comprises a flange formed integral with a longitudinally intermediate position thereof. A first tubular portion is formed in front of the flange, which defines engaging recesses in an inside wall thereof. A second tubular portion including a non-circular section is formed rearwardly of the flange. The rotatable braking members of the rear drag mechanism are engaged with the non-circular section of the second tubular portion, while the fixed braking members are supported peripherally on the second tubular portion.

The clutch sleeve mounted on the spool shaft and extending from the front of the retainer sleeve similarly has an overall configuration, while the flange is formed integrally with one longitudinal end thereof The clutch sleeve defines projections on the peripheral surface of an intermediate portion thereof for engagement with the recesses formed in the retainer sleeve. The clutch sleeve further includes a support tube portion at the other end portion thereof for supporting the retainer sleeve. The retainer sleeve is supported on the support tube portion of the clutch sleeve, and the clutch sleeve is forwardly movable relative to the retainer sleeve. This construction prevents disalignment between the retainer sleeve and the clutch sleeve.

A guide sleeve is provided for guiding the clutch sleeve. The sleeve has recesses formed in an inside wall thereof. The recesses engage with the projections. The clutch sleeve is inserted into the guide sleeve with the projections engaging the recesses, whereby the clutch sleeve is axially movable relative to and rotatable with the guide sleeve. The guide sleeve defines a plurality of grooves on an outer periphery thereof The rotatable braking member of the front of the drag brake mechanism is engagement with the grooves, while the fixed braking members are supported on the peripheral surface of the guide sleeve.

SUMMARY OF THE INVENTION

To resolve the above problems, an object of the present inventions is to provide a spinning reel having a drag clutch of a simple structure.

Another object of the present invention is to provide a spinning reel capable of rapidly engaging the clutch sleeve with a retainer sleeve.

Still another object of the present invention is to provide a spinning reel capable of finely adjusting the free rotation of the spool shaft.

To achieve the above objects, the spinning reel according to the present invention comprises a reel body; a spool shaft mounted in the reel body of the reel to be rotatable and axially movable; a clutch sleeve including a tubular portion having a non-circular internal surface and a circular external surface and mounted on one end portion of the spool shaft to be relatively unrotatable and axially movable, a flange having an engaging groove formed on one end of the tubular portion, and a plurality of projections protruded axially from the flange; a retainer sleeve including a plurality of recesses formed complementary to the projections of the retainer sleeve on a side surface facing the projections, and a non-circular tubular portion having a flat surface for supporting a drag braking plate and a plurality of washers to be relatively unrotatable; a master gear including a first gear meshed with a pinion gear mounted on one end of the spool shaft, a second gear meshed with an auxiliary gear, and a hollow shaft connecting the first and second gears in a vertical direction; a hollow operating member including a latch one end of which is inserted into the groove of the clutch sleeve, and a boss formed on the other end thereof; a pushing member located on an upper surface of the first gear of the master gear within a range of rotation of an arm extended radially from a rotating plate rotating together with the first gear, and constantly abutting with a bent portion of the operating member by means of a spring; and a clutch member pivotally movable by means of the clutch lever.

The spinning reel may further comprise a first gear engaged with a pinion gear mounted on one end portion of the spool shaft; a second gear engaged with an auxiliary gear; a master gear having a hollow shaft connecting the first gear with the second gear in a vertical direction; a latch one end of which is inserted into a groove of the clutch sleeve; a driving member having a boss formed at the other end portion of the latch; a pushing member positioned on an upper surface of the first gear of the master gear within the rotating range of an arm extended radially from the rotating plate and is constant in contact with a bent portion of the driving member by a spring; and a clutch member vertically moved by the clutch lever

BRIEF DESCRIPTION OF THE DRAWINGS

The above objects, other features and advantages of the present invention will become more apparent by the preferred embodiment described with reference to the accompanying drawings, in which.

DETAILED DESCRIPTION OF THE PREFERRED EMBODIMENT

A preferred embodiment of the spinning reel according to the present invention will now be explained with reference to the accompanying drawings.

Figure 1:
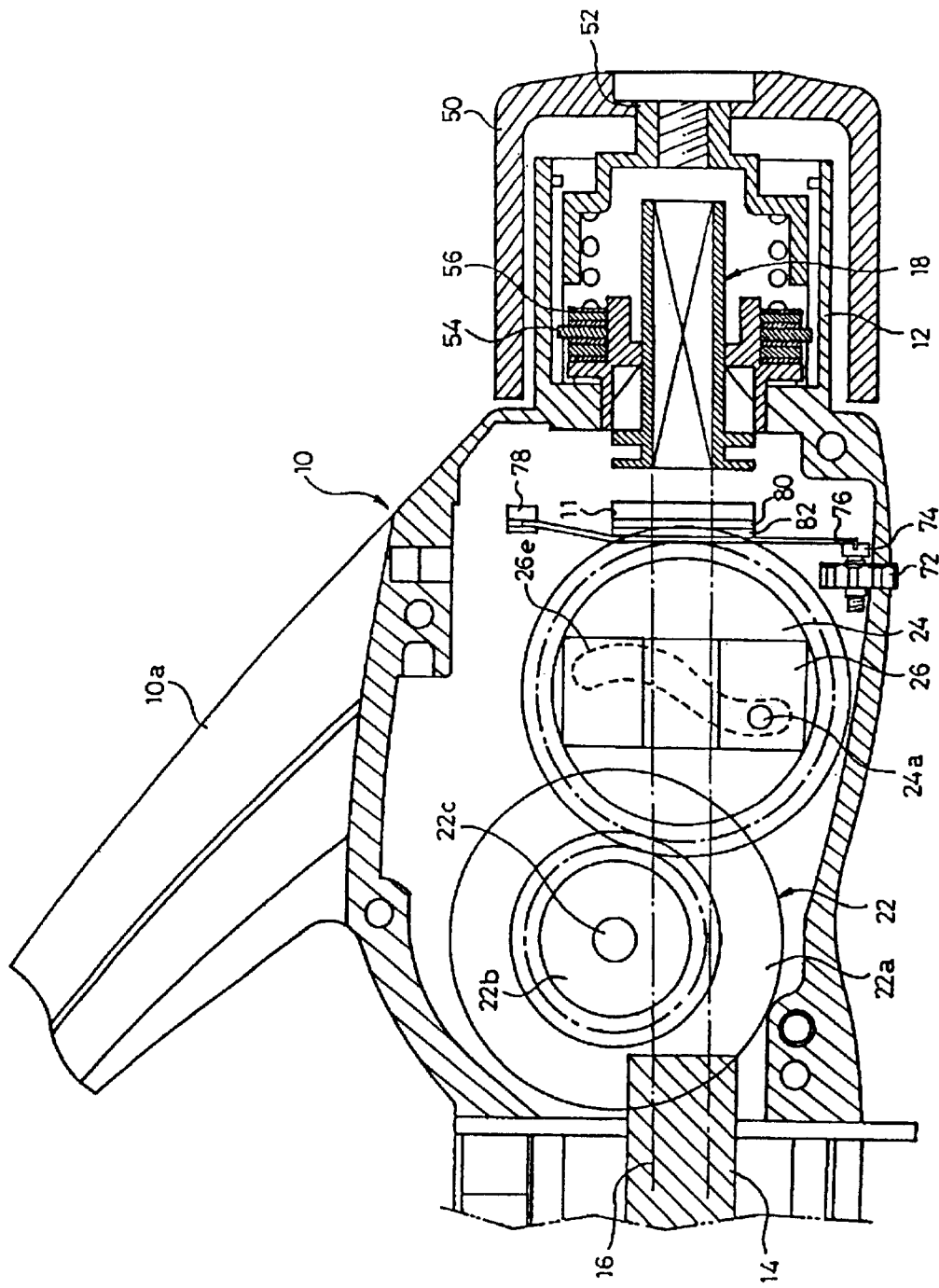
FIG. 1 is a cross-sectional view illustrating the driving mechanism of the spinning reel according to the present invention.

FIG. 1 shows a spinning reel comprising a hollow reel body 10 having a leg 10a extending from an upper surface thereof for engagement with a fishing rod (not shown). A solid spool shaft 16 is mounted in a longitudinal direction of the reel body to be movable axially thereto and unrotable relative to the body. A spool is mounted on one end of the spool shaft 16, while a drag brake mechanism is mounted on the other end thereof.

To enable the spool shaft 16 to move axially in the reel body, a reciprocating member 26 is mounted on the spool shaft 16. The reciprocating member 26 is consisted in such a way that the rotating force of an auxiliary gear 24 can be converted into a translational movement, as will be explained below.

The auxiliary gear 24 is engaged with the master gear 22 rotated by a handle (not shown). Specifically, the master gear 22 comprises a first gear 22a, a second gear 22b engaged with the auxiliary gear 24, and a hollow shaft 22c for connecting the first and the second gears in a vertical direction. A handle shaft is inserted into the hollow shaft 22c so as to rotate with the handle.

The pinion gear 14 is mounted on the spool shaft 16 to be rotatable and to be unmovable axially. The spool is mounted on the front side thereof (not shown). Accordingly, the pinion gear 14 can perform a reciprocal movements together with the spool shaft 16 which performs rotational and translational movements by means of the first gear 22a.

Figure 2:
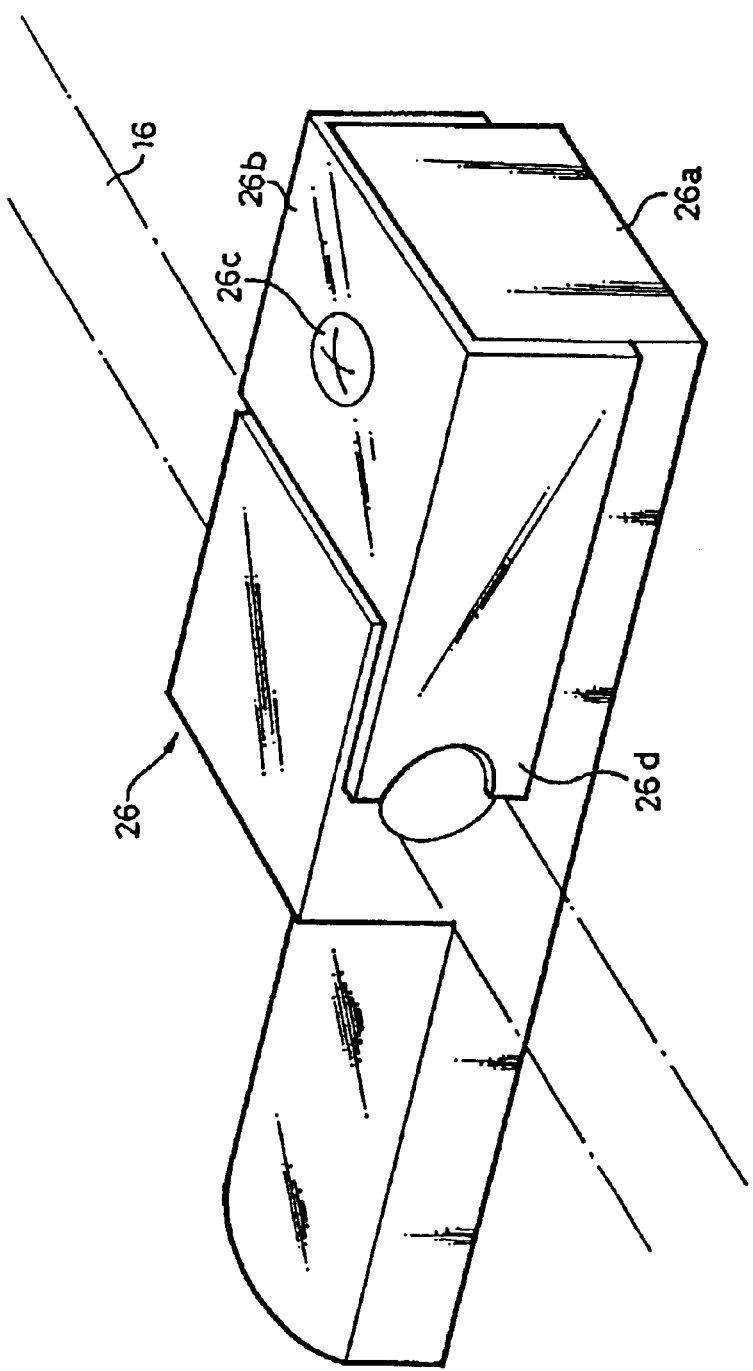
FIG. 2 is a perspective view illustrating the reciprocating member of FIG. 1.

Referring to FIG. 2 illustrating the reciprocating member 26, the reciprocating member 26 comprises a main body 26a for housing the spool shaft 16, a fixed plate 26b fixed to a portion of the main body 26b, and a S-shaped groove 26e formed on a lower surface of the main body 26a. To fix the reciprocating member 26 to the spool shaft 16, the fixing plate 26b comprises a pair of arms 26d insertable into the grooves (not shown) formed along the periphery of the spool shaft 16. A boss 24a formed on the upper surface of the auxiliary gear 24 is inserted into the groove 26e formed on the lower surface of the main body 26a.

According to the structure described above, the boss 24a formed on the upper surface of the auxiliary gear 24 rotates together with the auxiliary gear 24. If the reciprocating member 26 is closely adjacent to the upper surface of the auxiliary gear 24 while the boss 24a is inserted into the groove 26e, the reciprocating member 26 moves horizontally according to the rotation of the boss 24a together with the spool shaft 16 fixed on the reciprocating member 26.

Figure 5:
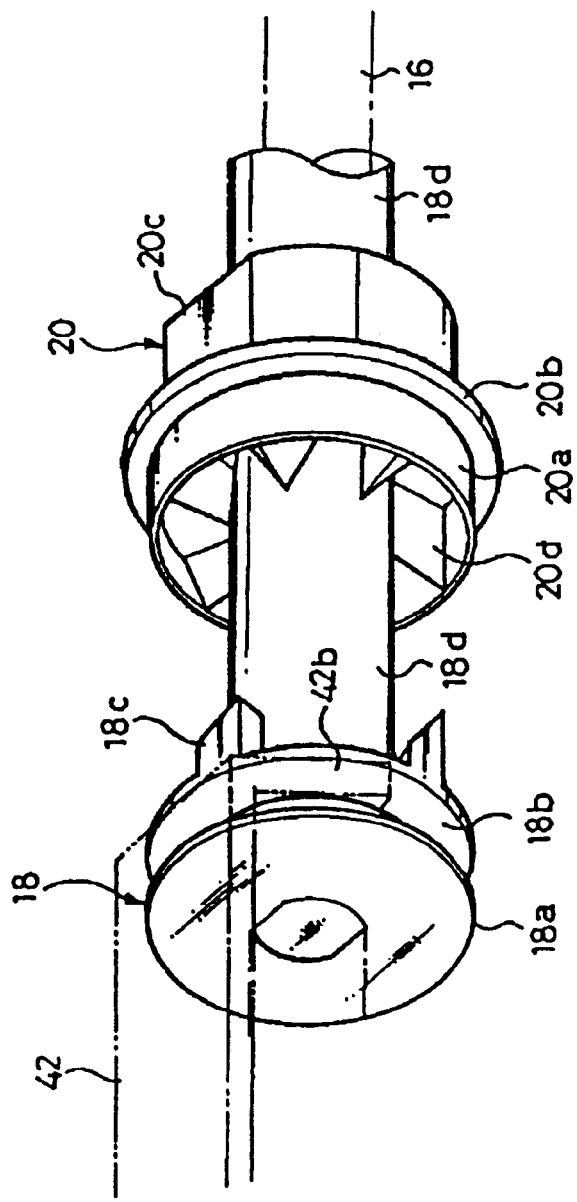
FIG. 5 is a cross-sectional view illustrating the drag brake mechanism according to the present invention.

As shown in FIG. 5, the drag brake mechanism inserted into one end of the spool shaft comprises a hollow clutch sleeve 18 inserted to one end portion with a flat surface being formed to be unrotable relative thereto an movably axially, and a retainer sleeve 20 mounted on a tubular portion of the clutch sleeve 18 to be movable axially.

Specifically, the clutch sleeve 18 comprises a tubular portion 18d having a non-circular internal surface and a circular external surface, a flange 18a having an engaging groove 18b formed on one end of the circular section 18d, a plurality of projections 18c protruded axially from the flange. Each of the projections 18c is made in such a way that one side surface has a length longer than that of the other side surface.

The retainer sleeve 20 mounted on the tubular portion 18d of the clutch sleeve 18 comprises a plurality of recesses 20d formed on a side surface facing the projections 18c, a tubular portion 20c having a flat surface so that the drag braking plate 54 and a plurality of washers 56 can be supported be relatively unrotatable, and a flange 20b for preventing the braking plate and the washer from moving.

With the construction of the drag brake mechanism described above, the drag braking plate 54 and the washers 56 mounted on the tubular portion 20c of the retainer sleeve 20 apply the drag braking force to the retainer sleeve 20 by means of a control cap 50 and a pressing member 52. If the projections 18c of the clutch sleeve 18 are inserted into the recess 20a of the retainer sleeve 20, the drag braking force is directly transferred to the spool shaft 16 through the clutch sleeve 18. If the engagement between the projections 18c of the clutch sleeve 18 and the recess 20a of the retainer sleeve 20 is released, the drag braking force is not transferred to the spool shaft 16, thereby allowing the spool shaft to freely rotate.

Referring again to FIG. 1, a stopper 11 for limiting the backward movement of the clutch sleeve 18 is mounted on an inner surface of the main body 10. A drag gear 82 and washers 80 are installed on a side surface of the stopper 11 opposite to the clutch sleeve 18. The portion of the spool shaft 16, on which a flat surface is formed, penetrates the stopper 11, drag gear 82 and washers 80.

The drag gear 80 and the washers 82 are pressed toward the stopper 11 by means of a plate spring 76. One end of the plate spring 76 is inserted into the head portion of the control screw 74, while the other end of the plate spring 76 is inserted into a fixed portion 78 formed on the main body 10. The control screw 74 is horizontally moveable in accordance with the rotation of a control dial 72 externally protruded toward the main body.

The user can control free rotation of the spool shaft by adjusting the abutment between the drag gear 82 and the stopper 11 with the control dial 72.

Figure 3:
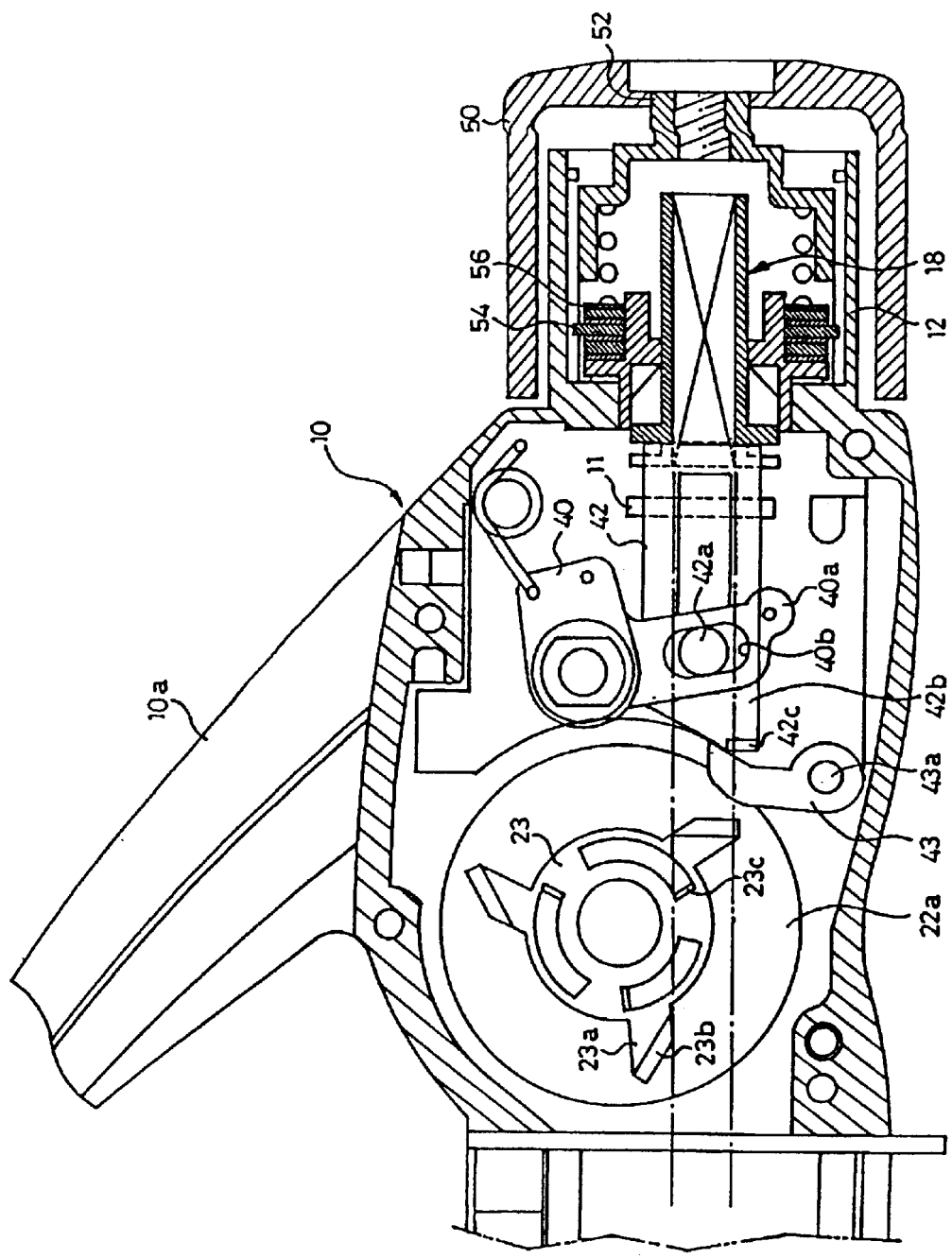
FIGS. 3 and 4 are cross-sectional views illustrating the operational state of the clutch in the spinning reel according to the present invention.
Figure 4:
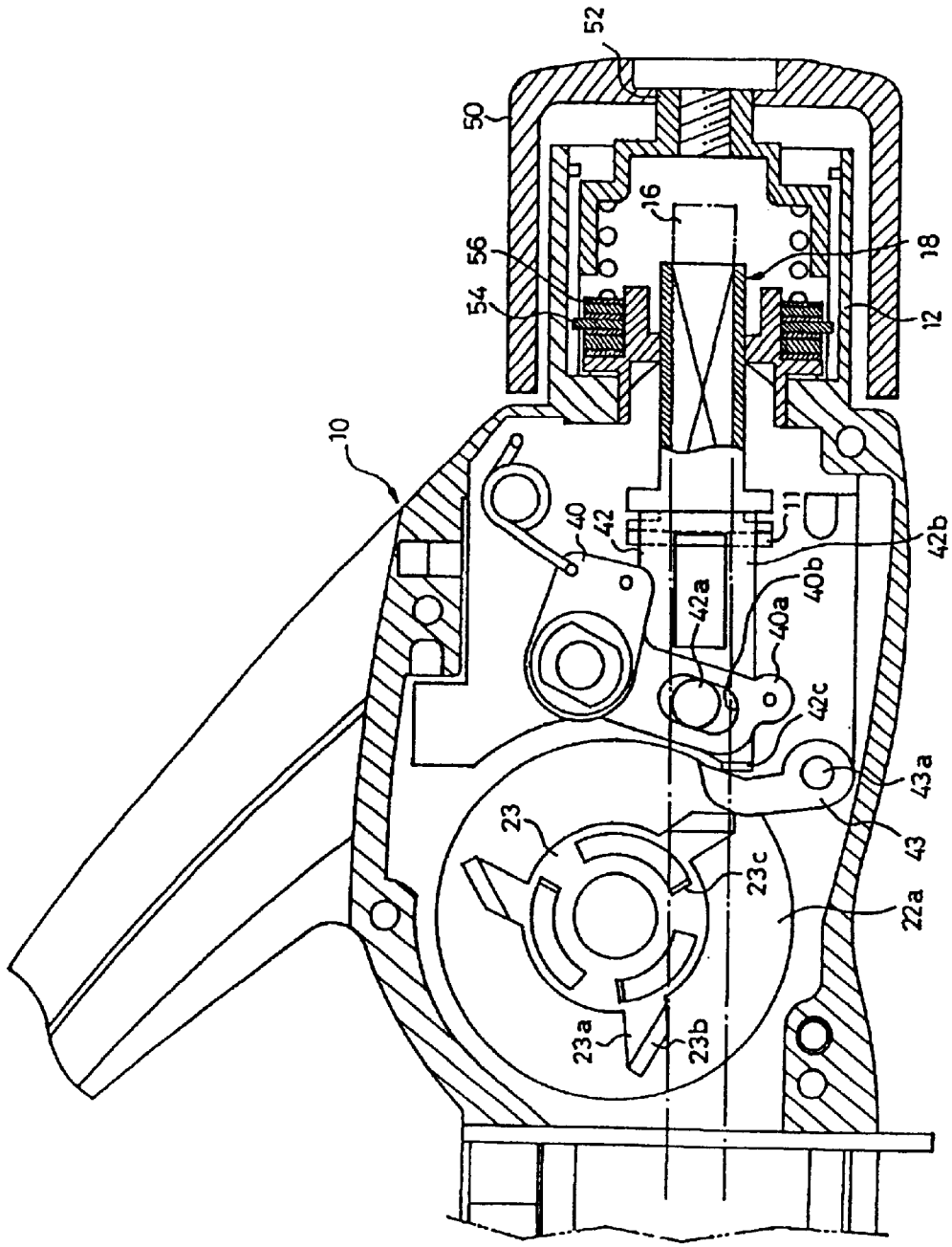

A detailed explanation will now be provided on the operation of the drag brake mechanism with reference to FIGS. 3 and 4.

A latch 42b perpendicularly extended from one end of the operating member 42 is inserted into the groove 18b of the clutch sleeve 18 toward the lower direction (FIG. 5). A boss 42a is inserted into the list 40b of the clutch member 40 on the other end portion of the operating member 42. The operating member 42 is axially movable by means of the clutch member 40 through the boss 42a. The clutch member 40 is horizontally movable by means of a clutch lever. The operation member 42 has a bent portion adjacent to a pushing member 43 at the other end thereof.

The pushing member 43 is positioned on an upper surface of the first gear 22a of the master gear within the rotating range of a blade 23 of the rotating plate 23, which rotates together therewith. Since the pushing member 43 is abutted with the bent portion of the operating member by means of a spring, however, the pushing member 43 may be positioned out of the rotating range of the blade 23 of the rotating plate 23 in accordance with the movement of the operating member 42. Following is a more detailed explanation on the operational relationship between the pushing member 43 and the blade 23.

FIG. 3 illustrates the state where the clutch sleeve 18 is engaged with the retainer sleeve 20. A braking force can be applied to the spool shaft under this state. As shown in FIG. 3 illustrating the state that the operating member 42 is retracting, the pushing member 43 is positioned beyond the rotating range of the rotating plate 23, which is positioned on an upper surface of the first gear 22a.

The rotating plate 23 has at least three arms 23a extended radially and a a bent portion 23b that has been bent upwardly from the end of the arm. A circular groove is formed on an upper surface of the first gear 22a, which is in contact with the rotating plate 23, so that the projections 23c of the rotating plate 23 can be inserted there into (not shown).

Referring to FIG. 4 illustrating the state that the operating member 42 is releasing, the clutch sleeve 18 is separated from the retainer sleeve 20. Under such a state, the braking force is not applied to the spool shaft. The braking force applied to the retainer sleeve 20 by means of the braking plate and the washers is not effective because the retainer sleeve 20 is not fixed on the spool shaft 16.

Under the state illustrated in FIG. 4, the blade of the rotating plate rotates while pushing the pushing member 43 toward the left side, even if the spool seems to rotate along the anti-winding direction of the reel, i.e., the clockwise direction. Accordingly, the pushing member 43 transfers no force to the operating member 42. If the spool rotates along the pro-winding direction of the reel, i.e., the anti-clockwise direction as appearing in FIG. 4, the blade rotates while pushing the pushing member, which is adjacent to the bent portion of the operating member, toward the right side. Accordingly, the operating member moves toward the right side, i.e., toward the coupling position, by means of the rotating force of the handle.

According to the construction of the present invention described above, the clutch sleeve can be quickly engaged with the retainer sleeve because abutting portions of them have complementary shape.

While the present invention has been described and illustrated herein with reference to the preferred embodiment thereof, it will be understood by those skilled in the art that various changes in form and details may be made therein without departing from the spirit and scope of the invention.

What is claimed is:

1. A spinning reel comprising:

a reel body;

a spool shaft mounted in the reel body of the reel to be rotatable and axially movable;

a clutch sleeve including a tubular portion having a non-circular internal surface and a circular external surface and mounted on one end portion of the spool shaft to be relatively unrotatable and axially movable, a flange having an engaging groove formed on one end of the tubular portion, and a plurality of projections protruded axially from the flange;

a retainer sleeve including a plurality of recesses formed complementary to the projections on a side surface of the retainer sleeve facing the projections, and a non-circular tubular portion having a flat surface for supporting a drag braking plate and a plurality of washers to be relatively unrotatable;

a master gear including a first gear meshed with a pinion gear mounted on one end of the spool shaft, a second gear meshed with an auxiliary gear, and a hollow shaft connecting the first and second gears in a vertical direction;

a hollow operating member including a latch one end of which is inserted into the groove of the clutch sleeve, and a boss formed on the other end thereof;

a pushing member located on an upper surface of the first gear of the master gear within a range of rotation of an arm extended radially from a rotating plate rotating together with the first gear and constantly abutting with a bent portion of the operating member by means of a spring; and a clutch member pivotally movable by means of the clutch lever.

2. The spinning reel as claimed in claim 1, further comprising a stopper for limiting backward movement of the clutch sleeve.

3. The spinning reel as claimed in claim 2, wherein the stopper is provided on one side of the clutch sleeve with a drag gear and a washer, and the flat surface of the spool shaft penetrates the stopper, drag gear and washer.

4. The spinning reel as claimed in claim 3, wherein the drag gear and washer are urged to the stopper by a plate spring.

5. The spinning reel as claimed in claim 4, wherein one end of the plate spring is inserted into a head portion of an adjusting screw, and the other end of the plate spring is inserted into a fixing portion formed on the main body, so that the adjusting screw is horizontally movable in accordance with rotation of a control dial protruded externally from the main body.

* * * * *